United States Patent
Timmons

(10) Patent No.: US 9,090,176 B2
(45) Date of Patent: Jul. 28, 2015

(54) METHOD AND DEVICE FOR ELECTROCHEMICAL CELL PROPAGATION AVOIDANCE IN A BATTERY MODULE

(71) Applicant: Adam Timmons, Birmingham, MI (US)

(72) Inventor: Adam Timmons, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 339 days.

(21) Appl. No.: 13/632,361

(22) Filed: Oct. 1, 2012

(65) Prior Publication Data

US 2014/0093764 A1   Apr. 3, 2014

(51) Int. Cl.
| | |
|---|---|
| *H01M 10/50* | (2006.01) |
| *B60L 11/18* | (2006.01) |
| *C09K 5/06* | (2006.01) |
| *H01M 2/10* | (2006.01) |
| *H01M 10/48* | (2006.01) |
| *H01M 10/613* | (2014.01) |
| *H01M 10/625* | (2014.01) |
| *H01M 10/651* | (2014.01) |
| *H01M 10/6554* | (2014.01) |
| *H01M 10/6555* | (2014.01) |
| *H01M 10/659* | (2014.01) |

(52) U.S. Cl.
CPC ......... *B60L 11/1874* (2013.01); *B60L 11/1879* (2013.01); *C09K 5/06* (2013.01); *H01M 2/1072* (2013.01); *H01M 10/482* (2013.01); *H01M 10/5004* (2013.01); *H01M 10/5016* (2013.01); *H01M 10/5036* (2013.01); *H01M 10/5053* (2013.01); *H01M 10/5055* (2013.01); *H01M 10/5089* (2013.01); *H01M 2200/10* (2013.01); *H01M 2220/20* (2013.01); *Y02T 10/705* (2013.01); *Y02T 10/7005* (2013.01)

(58) Field of Classification Search
None
See application file for complete search history.

(56) References Cited

U.S. PATENT DOCUMENTS

| | | | |
|---|---|---|---|
| 2008/0292950 A1* | 11/2008 | Maeda et al. | 429/120 |
| 2009/0111010 A1* | 4/2009 | Okada et al. | 429/120 |
| 2010/0304257 A1 | 12/2010 | Chan et al. | |
| 2011/0151297 A1 | 6/2011 | Shimizu et al. | |
| 2011/0159340 A1* | 6/2011 | Hu et al. | 429/120 |

FOREIGN PATENT DOCUMENTS

| | | |
|---|---|---|
| JP | S59-151778 A | 8/1984 |
| JP | S60-17869 A | 1/1985 |
| JP | 2011253747 A | 12/2011 |

OTHER PUBLICATIONS

International Search Report and Written Opinion dated Feb. 6, 2014, International Application No. PCT/US2013/057012, International Filing Date.

* cited by examiner

*Primary Examiner* — Carlos Barcena
*Assistant Examiner* — Wojciech Haske
(74) *Attorney, Agent, or Firm* — Ralph E Smith

(57) ABSTRACT

A method and device for cooling an electrochemical cell is provided. In one embodiment, the cooling element for an electrochemical cell includes a metal element configured to engage with an electrochemical cell and absorb thermal energy from the electrochemical cell. The metal element is configured to melt into a liquid when the electrochemical cell exceeds an eutectic temperature of the metal element.

10 Claims, 5 Drawing Sheets

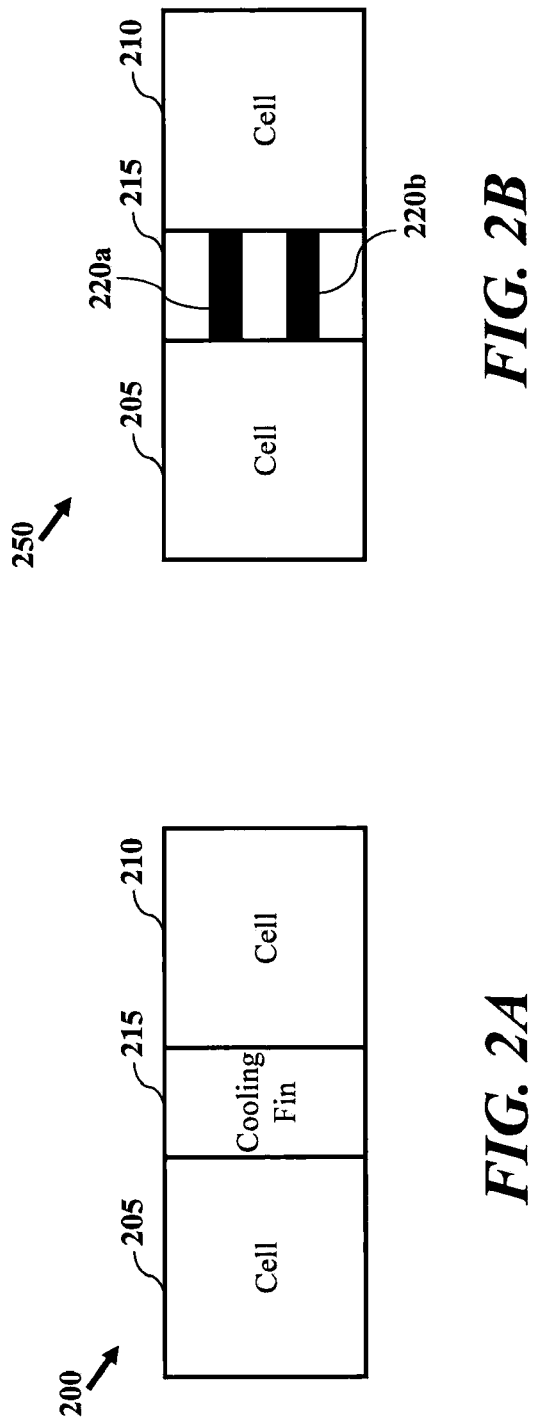

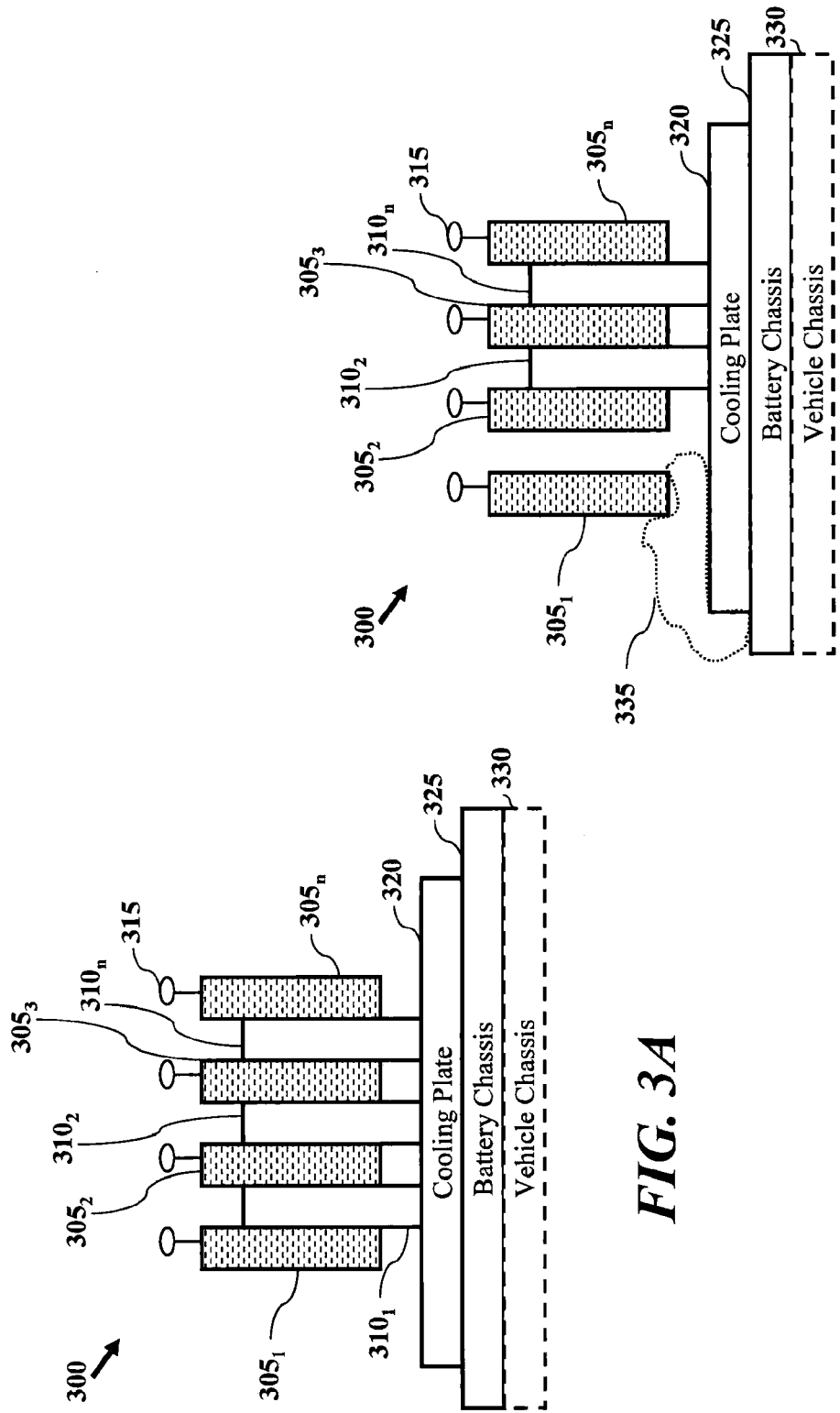

METHOD AND DEVICE FOR ELECTROCHEMICAL CELL PROPAGATION AVOIDANCE IN A BATTERY MODULE

FIELD

The present disclosure relates to energy storage systems, particularly to a device and method for cooling electrochemical cells typically used in a vehicle power source.

BACKGROUND

Electrochemical cells can experience thermal events resulting in temperature increases for a cell. These temperature increases can damage a cell and in some cases result in propagation of thermal energy to one or more additional cells. Propagation of thermal energy can damage neighboring cells or other elements in proximity to an electrochemical cell. A drawback of current electrochemical cells and methods for cooling electrochemical cells is that thermal energy propagation may be promoted. In addition, conventional methods for cooling electrochemical cells may be volumetrically and thermally inefficient.

One conventional solution for cooling an electrochemical cell is to include cooling channels within a cooling element, the cooling channels including a fluid exchange to absorb thermal energy. One drawback of this approach can be increased cost for electrochemical cell cooling. Another drawback of conventional devices may be an inability to separate electrochemical cells from other electrochemical cells when a cell has overheated. Further, failure of cooling elements to absorb excessive heat may lead to the return of heat to an electrochemical cell. Cell cooling and detection of faults due to overheating may be necessary to promote safety as overheated cells can ignite or burst. In the particular case of vehicle energy systems, safety of the energy system may be critical, as overheating can lead to loss of vehicle power and potential harm to passengers.

Accordingly, there is a need and desire for a cooling mechanism for electrical chemical cells.

SUMMARY

In one form, the present disclosure provides a cooling element for an electrochemical cell. The cooling element comprising a metal element configured to engage with an electrochemical cell and absorb thermal energy from the electrochemical cell. The metal element is configured to melt into a liquid when the electrochemical cell exceeds an eutectic temperature of the metal element.

The present disclosure also provides an energy storage system comprising an electrochemical cell and a cooling element configured to engage the electrochemical cell and absorb thermal energy from the electrochemical cell. The cooling element is configured to melt into liquid when the electrochemical cell exceeds an eutectic temperature of the cooling element. In one embodiment, the energy storage system is a vehicle power source.

In another embodiment, a method is provided for detecting a fault in an energy storage system comprising a cooling member.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIGS. 2A-2B are graphical representations of electrochemical cells in accordance with embodiments of the present disclosure;

FIGS. 3A-3B are graphical representations of energy storage systems in accordance with one or more embodiments of the present disclosure;

DETAILED DESCRIPTION

Figure 1B:
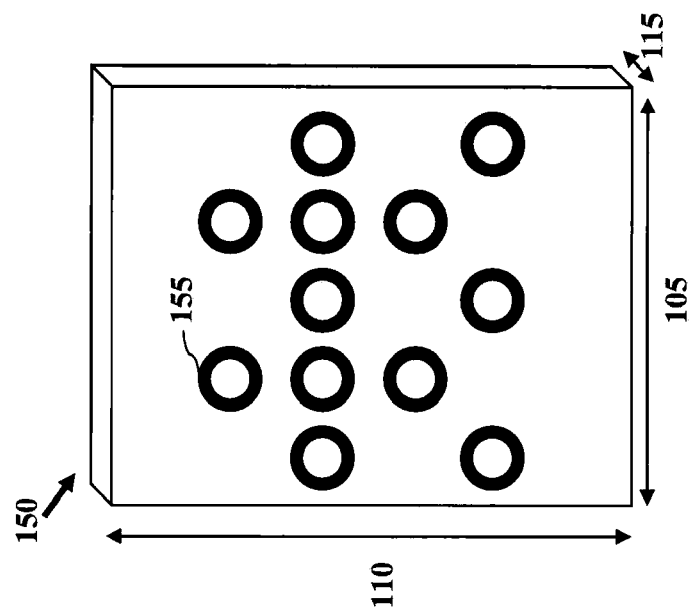
FIG. 1B is a graphical representation of a cooling element in accordance with another embodiment of the present disclosure.
Figure 1A:
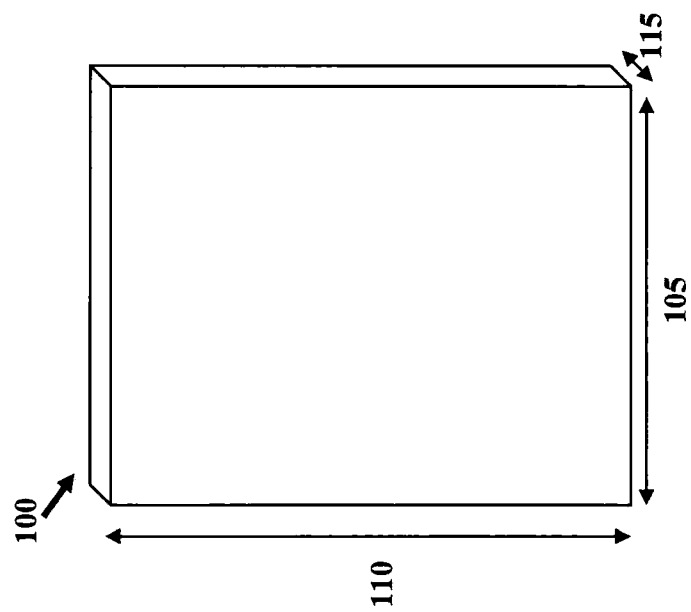
FIG. 1A is a graphical representation of a cooling element in accordance with an embodiment of the present disclosure.

FIGS. 1A-1B illustrate cooling elements according to one or more embodiments of the disclosure. Referring first to FIG. 1A, cooling element 100 is illustrated in accordance with a first embodiment of the present disclosure. Cooling element 100 may be configured for thermal management of electrochemical cells. In certain embodiments, cooling element 100 may relate to a cooling fin configured to draw and/or absorb heat from an electrochemical cell typically used in a vehicle power source (as described below). According to another embodiment, cooling element 100 may be designed to undergo a physical transformation (e.g., melt) when thermal energy absorbed from an electrochemical cell exceeds a predetermined temperature. By undergoing a phase change in response to electrochemical cell temperature, the cooling element 100 may absorb heat as it melts and produce an air gap to avoid thermal propagation from one electrochemical cell to another. For example, to avoid thermal propagation from the cell experiencing the thermal event resulting in high temperatures to one or more neighboring cells. One benefit of the cooling elements 110,150 of FIGS. 1A-1B may be to provide a cooling mechanism for electrochemical cells based on the heat conduction properties of desired element (e.g., metal, plastic, etc.) without the need for coolant running through the cooling element.

Cooling element 100 may be comprised of one or more metals. In one embodiment, cooling element 100 can be an alloy of tin and bismuth (e.g., Sn—Bn alloy). As will be discussed in more detail with respect to FIG. 6, the composition of cooling element 100 may be an eutectic composition with an eutectic point to allow for melting in response to overheating by an electrochemical cell. Although cooling elements are described herein as being metal and/or metal alloy elements, it should be appreciated that the embodiments described herein may employ plastic or non-metal materials with similar characteristics.

According to one embodiment, cooling element 100 may be configured/designed to melt when a cell is overheating. The heat needed to melt metal of cooling element 100 can be drawn from a cell experiencing a thermal event that has caused high temperature. By way of example, overheating of the electrochemical cell may occur at temperatures of about 150° C. when cells are designed to operate up to temperatures of about 60° C. Thus, the cooling element 100 may be configured and/or designed to maintain a solid form for at least temperatures below 60° C.

Cooling element 100 is depicted as a sheet-like member, however, it should be appreciated that cooling element 100 may take on one or more other forms. For example, the dimensions of cooling element 100 may be based on its use as a spacer between two electrochemical cells, the electrochemical cell shape, and/or the cooling element shape. In addition, one or more dimensions of cooling element 100 may be selected to allow cooling element 100 to deform to the surface of an electrochemical cell. For example, cooling element 100 may be comprised of a soft metal that can conform to any irregularities in electrochemical cell surfaces and promote efficient thermal contact for normal heating and cooling conditions. In addition, cooling element 100 may be dimensioned to conform and/or engage with a cooling plate and allow for a thermal contact between the cooling plate and the cooling element.

As depicted in FIG. 1A, cooling element 100 is depicted as having a width 105, length 110, and thickness 115. In an exemplary embodiment, cooling element 100 may have a width 105 of 15 cm, length 110 of 22 cm, and thickness 115 of 1 mm. Exemplary values for cooling element 100 may include a width 105 within the range of 5 to 25 cm, length 110 within the range of 10 to 44 cm, and thickness 115 of 0.5 to 5 mm. It should be appreciated that the dimensions of cooling element 100 may be different depending upon the application it is being used in.

Referring now to FIG. 1B, another cooling element 150 is depicted in accordance with another embodiment disclosed herein. Cooling element 150 may have similar features to cooling element 100 described above with respect to FIG. 1A. Cooling element 150 includes a plurality of spacers 155. Spacers 155 may be employed to provide an air gap between electrochemical cells once the metal of a cooling element melts; the air gap thermally separating an overheating cell from its neighboring cells. According to one embodiment, spacers 155 may be embedded into cooling element 150 to facilitate continued electrochemical cell separation upon melting of the metal and removal of excess stack pressure from the metal while maintaining adequate vertical stack pressure on the stack of electrochemical cells.

Spacers 155 may be cylindrical plastic elements. In one embodiment, spacers 155 may be thermally non-conducting. Spacers 155 may be comprised of a polyurethane, polyol, pentaerythritol (e.g., stiff white polyol plastic polyurethane) or other material(s) that melt at temperatures greater than 315° C. and exhibit very low heat conductivity. According to one embodiment, spacers 155 may be configured to melt at a temperature greater than roughly the maximum temperature at the surface of a Li-ion cell during a reduction reaction thermal event.

According to one embodiment, cooling element 150 may include a matrix or pattern of spacers 155. The pattern of spacers in cooling element 150 can provide structural integrity and crush resistance for cooling element 150 without compromising the purpose of the cooling element. Metal of cooling element 150 can melt to prevent thermal propagation and overheating of a neighboring cell. An array of spacers, such as spacer 155, can allow cooling elements to press against and apply pressure to the face of electrochemical cells, which can provide long cell life and good thermal contact between the cooling element and the cell.

FIGS. 2A-2B are graphical representations of electrochemical cells in accordance with an embodiment of the present disclosure. FIG. 2A illustrates an electrochemical cell module 200 including electrochemical cell 205, electrochemical cell 210, and cooling fin 215. Electrochemical cells 205 and 210 may be individual cells of an energy storage system, such as a battery pack, power supply, or vehicle battery source. Cooling fin 215 may be one of the cooling elements 100, 150 described above in reference to FIGS. 1A and 1B. Cooling fin 215 may be configured to absorb heat and cool electrochemical cell 205 and/or electrochemical cell 210.

In one embodiment, an increase in temperature of electrochemical cell 205 or electrochemical cell 210, due to a thermal event or overheating, can result in cooling fin 215 undergoing a change from solid phase to liquid phase. In such a case, the metal of cooling fin 215 will melt. As such, an air gap will be created between electrochemical cells 205 and 210. A thermal event may be caused by overheating by one or more of electrochemical cell 205 and/or cell 210. Electrochemical cells may overheat under various abuse conditions. For example, thermal events may be due to a field short (e.g., a short circuit in the cell), an external short (e.g., short is exerted up on a cell), overcharging of a cell and/or over-discharging of a cell. Thermal events may similarly be caused by cell damage, such as the deformation of the cell causing an internal short. Thermal events or faults may also be due to cells spontaneously exhibiting higher internal resistance resulting in a field failure (e.g., current from cells in series will causing a cell to overheat).

In one exemplary embodiment, if the heat cannot be extracted fast enough at an elevated temperature, such as 90° C., then a cell, such as a Li-ion cell with a graphite negative electrode, will begin to create heat as chemicals within the cell begin to deteriorate exothermically. This can cause a fairly rapid rise of temperatures in the cell to above 150° C. and up to greater than 300° C., potentially faster than the energy storage system can react. According to one embodiment, the energy storage system may open contactors (e.g., switches) to the storage system, thus causing the flow of current in the electrochemical cells to stop, in response to such an elevated temperature. Once the temperature of a cell is above 150° C. for particular periods of time, heat given off to neighboring cells can initiate a similar overheating state and/or propagation to one or more other cells. For energy storage systems in a vehicle, when the vehicle and battery are on and a thermal event is detected in time, the thermal system can try to remove the heat from the overheating cells as fast as possible to prevent propagation. However, when the vehicle is off, an energy storage system and possibly vehicle may be severely damaged if the thermal event is not avoided in time. Cooling elements and fins, as described herein, can be less expensive, more efficient and more reliable to deal with thermal events relative to conventional methods.

FIG. 2B depicts electrochemical cell module 250 after cooling fin 215 of FIG. 2A has undergone a phase change. In particular, FIG. 2B depicts electrochemical cell 250 including electrochemical cell 205, electrochemical cell 210, and spacers 220a and 220b. Spacers 220a and 220b may exert a force on electrochemical cell 205 and electrochemical cell 210. Spacers 220a and 220b may additionally provide an air gap between the electrochemical cells for heat to dissipate when a cooling element has melted.

According to another embodiment, the cooling elements described herein may be employed in energy storage systems, such as battery modules typically used in vehicles. FIGS.

3A-3B are graphical representations of energy storage systems in accordance with an embodiment of the present disclosure.

FIG. 3A depicts energy storage system 300, which may be a multi-celled battery pack, including electrochemical cells $305_1$, $305_2$, ... $305_n$ and cooling fins $310_1$, $310_2$, ... $310_n$. Electrochemical cells $305_1$, $305_2$, ... $305_n$ may each include terminals (e.g., positive and negative terminals), such as terminal 315, to provide electrical power from the electrochemical cells. According to one embodiment, electrical storage system 300 may include cooling plate 320 to absorb and/or remove heat from one or more cooling elements, such as cooling fins $310_1$, $310_2$, ... $310_n$. Cooling plate 320 may be beneath cells $305_1$, $305_2$, ... $305_n$ and cooling fins $310_1$, $310_2$, ... $310_n$. In one embodiment, cooling fins $310_1$, $310_2$, ... $310_n$ are attached to cooling plate 320. Cells $305_1$, $305_2$, ... $305_n$ may be in contact with cooling fins $310_1$, $310_2$, ... $310_n$.

Cooling plate 320 can be fastened and/or electrically connected to battery chassis 325, another module and/or battery component subsequently connected to battery chassis 325. When energy storage system 300 relates to a vehicle power source, battery chassis 325 may be fastened to a vehicle chassis, such as optional vehicle chassis 330. The positive and negative terminals of energy storage system 300 are electrically isolated from battery chassis 325 and vehicle chassis 330.

Figure 5:
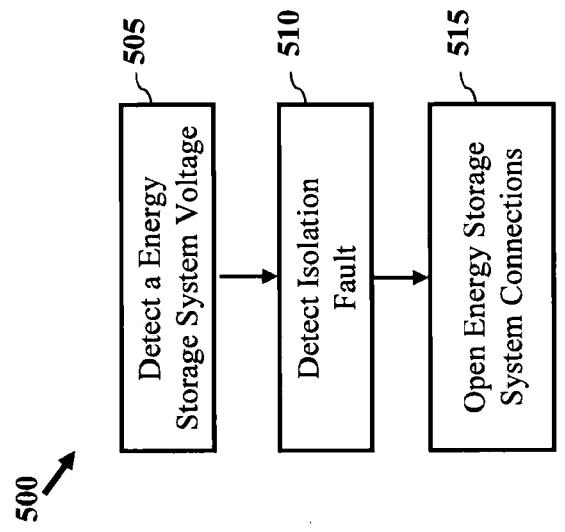
FIG. 5 is a process for detecting a fault in accordance with an embodiment of the present disclosure.

Energy storage system 300 may be configured to detect an isolation fault. FIG. 3B depicts a representation of melting, in one exemplary situation, of a cooling element 335 which contacts cell $305_1$ and battery chassis 325. FIG. 5 below discusses detection of an isolation fault caused by a melted element, such as element 335, in more detail below. By way of example, if a cooling fin is configured to melt when a cell overheats, then a point on the surface of the edge of the cell (e.g., not on the face where the cooling fin normally makes contact with the cell) could be tied electrically to one of the terminals of the cell. As such, melted or molten metal of a formally solid cooling fin could electrically bridge the metal cooling plate and to one or more cells connected to battery chassis 325 creating an isolation fault.

Figure 4:
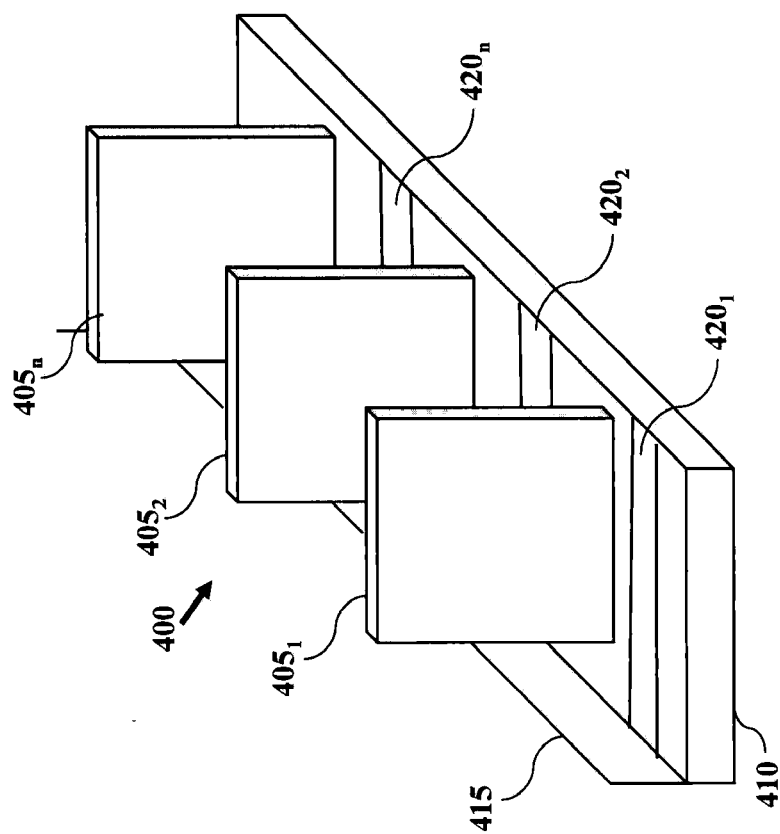
FIG. 4 is a graphical representation of a cooling module in accordance with an embodiment of the present disclosure.

FIG. 4 is a graphical representation of a cooling module in accordance with an embodiment of the present disclosure. According to one embodiment, the cooling module may include one or more cooling elements or cooling fins as described herein. FIG. 4 depicts cooling module 400 including a plurality of cooling fins $405_1$, $405_2$, ... $405_n$ and cooling plate 410. Cooling module 400 may be arranged to conform to one or more energy storage system arrangements such that cooling fins $405_1$, $405_2$, ... $405_n$ engage and/or contact electrochemical cells. Cooling fins $405_1$, $405_2$, ... $405_n$ may also be configured to melt in response to an overheating of an electrochemical cell. According to one embodiment, cooling module 400 may be configured to include one or more elements to retain cooling fins $405_1$, $405_2$, ... $405_n$, such as support 415. According to another embodiment, cooling plate 410 may include one or more channels, such as channels $420_1$, $420_2$, ... $420_n$, to allow for removal of a melted material from a cooling fin.

FIG. 5 is a process 500 for detecting a fault in accordance with an embodiment of the present disclosure. According to one embodiment, a molten cooling element may electrically tie terminals of an electrochemical cell and a cooling plate to result in a fault condition. The process 500 may be initiated by detecting voltage of the energy storage system such as e.g., the voltage of the electrochemical terminals at block 505. An isolation fault may be detected at block 510 when e.g., a terminal of an electrochemical cell is electrically connected to the vehicle chassis (via the battery chassis). The energy storage system can open energy storage system connections at block 515 based on the detection of the fault connection. The energy storage system may provide an indication to other devices of the isolation fault; in the case of a vehicle power source, battery contactors (e.g., switches that connect the battery to the vehicle's propulsion or charging systems) will open and cause the vehicle to go into a shutdown or limp mode (e.g., low power mode).

Figure 6:
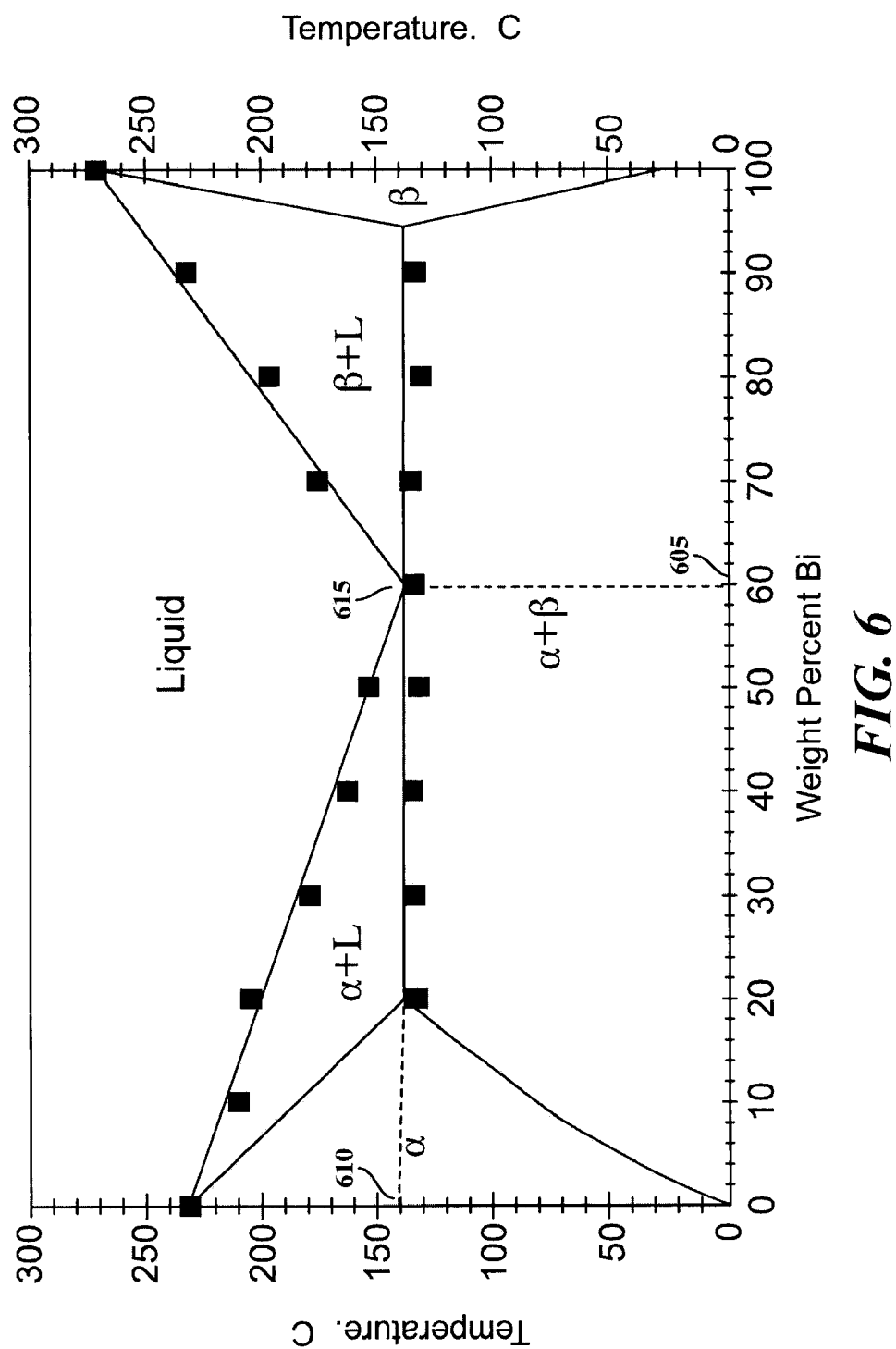
FIG. 6 is a graphical representation of a state diagram of a cooling element in accordance with an embodiment of the present disclosure.

FIG. 6 is a graphical representation of a state diagram of a cooling element in accordance with one or more embodiments. Cooling elements may be configured to melt when an electrochemical cell reaches temperatures of about 150° C., whereas the cells are designed to operate only up to temperatures of about 60° C. FIG. 6 depicts an eutectic composition 605, eutectic temperature 610 and eutectic point 615 for a cooling element comprised of Sn—Bi according to one or more embodiments. It should be appreciated that composition values and characteristics of a composition of a cooling element described in relation to FIG. 6 are exemplary, and that other values may be employed without departing from the spirit of the embodiments.

The cooling elements and energy storage systems described herein can advantageously absorb heat from electrochemical cells and discourage thermal propagation. In addition, volumetric and thermally efficient cooling may be provided for vehicles, and in particular vehicles using a battery pack or electrical energy source for propulsion. Additional benefits of the embodiments described herein include the ability to promote cell cooling, vehicle safety, and fault detection for vehicle energy systems.

What is claimed is:

1. A vehicle energy storage system comprising:
   first and second electrochemical cells;
   a cooling element interposed between and configured to engage the first and second electrochemical cells and absorb thermal energy from the electrochemical cells, the cooling element being configured to absorb heat and melt from a solid form when at least one of the first and second electrochemical cells exceed an eutectic temperate of the cooling element thereby creating an air gap between the first and second electrochemical cells to avoid thermal propagation from the first electrochemical cell to the second electrochemical cell, the solid form of the cooling element being configured to maintain the first and second electrochemical cells spaced apart from one another; and
   a cooling plate positioned beneath the first and second electrochemical cells and the cooling element, the cooling plate in supporting engagement with the cooling element and spaced apart from the electrochemical cells, the cooling plate including a channel adjacent to and beneath the cooling element and configured to receive melted material of the cooling element and divert the melted material from the electrochemical cells.

2. The energy storage system of claim 1, wherein the cooling element is a metal alloy element comprised of tin (Sn) and bismuth (Bi).

3. The energy storage system of claim 1, wherein the eutectic temperature of the cooling element is between 100 and 150 degrees Celsius.

4. The energy storage system of claim 1, wherein the cooling element comprises at least one plastic spacer embedded within the cooling element and in engagement with the first and second electrochemical cells.

5. The energy storage system of claim 4, wherein the at least one plastic spacer is one of a polyol plastic, pentaerythritol, and polyurethane.

6. The energy storage system of claim 1, wherein the eutectic temperature of the cooling element is based on an operating temperature of the electrochemical cell.

7. The energy storage system of claim 1, wherein the energy storage system is a vehicle battery pack comprising a plurality of electrochemical cells, each electrochemical cell associated with a cooling element.

8. The energy storage system of claim 1, wherein the cooling element comprises a sheet having length and height dimensions corresponding to length and height dimensions of the first and second electrochemical cells.

9. The energy storage system of claim 8, wherein the cooling element comprises a matrix of cylindrical plastic spacers embedded within the cooling element and in engagement with the first and second electrochemical cells.

10. The energy storage system of claim 1, further comprising a battery chassis positioned beneath and in engagement with the cooling plate.

* * * * *